United States Patent [19]
Koshi et al.

[11] Patent Number: 5,631,977
[45] Date of Patent: May 20, 1997

[54] ENCODING DEVICE FOR ENCODING AN IMAGE ALONG AN ORDER DETERMINED BY RESOLUTION TONE LEVEL

[75] Inventors: Yutaka Koshi; Shunichi Kimura; Koh Kamizawa, all of Kanagawa, Japan

[73] Assignee: Fuji Xerox Co., Ltd., Tokyo, Japan

[21] Appl. No.: 506,178

[22] Filed: Jul. 25, 1995

Related U.S. Application Data

[63] Continuation of Ser. No. 162,477, Dec. 7, 1993, abandoned.

[30]    Foreign Application Priority Data

Dec. 8, 1992  [JP]  Japan .................................. 4-328265
Jan. 27, 1993  [JP]  Japan .................................. 5-012030

[51] Int. Cl.⁶ ............................................... G06K 9/36
[52] U.S. Cl. ...................................................... 382/239
[58] Field of Search ................................. 382/270–273, 382/254, 234, 239; 358/433, 464–467

[56]        References Cited

U.S. PATENT DOCUMENTS 5,243,444  9/1993  Fan .............................................. 382/54
5,267,330  11/1993  Masuda ....................................... 382/50
5,282,256  1/1994  Ohsawa et al. ............................. 382/56
5,289,294  2/1994  Fujisawa ..................................... 382/54

FOREIGN PATENT DOCUMENTS 5-40823  2/1993  Japan .
5-56282  3/1993  Japan .

OTHER PUBLICATIONS

A thesis entitled "Bit–Rate Control Method for DCT Image Coding D–45", The Institute of Electronics, Information and Communication Engineers, Autumn, 1989.
A thesis entitled "A Rate–Adaptive DCT Coding for use in Solid–State Still Camera D–159", The Institute of Electronics, Information and Communication Engineers, Autumn, 1989.

*Primary Examiner*—Jose L. Couso
*Attorney, Agent, or Firm*—Finnegan, Henderson, Farabow, Garrett & Dunner, L.L.P.

[57]            ABSTRACT

An image encoding device. The image encoding device divides the image into blocks, analyzes each block, truncates the block and determines an order using approximate points, quantizes the image data along the order determined in the truncation step, an encodes the data. Processing images with parameters along a determined order permits high quality encoded images within a limited amount of data.

14 Claims, 12 Drawing Sheets

- ⊙ INSERTING PIXELS AT THE SUB-SAMPLING RATIO 1/8
- △ INSERTING PIXELS AT THE SUB-SAMPLING RATIO 1/4
- ▫ INSERTING PIXELS AT THE SUB-SAMPLING RATIO 1/2
- ⊠ INSERTING PIXELS AT THE SUB-SAMPLING RATIO 1

ENCODING DEVICE FOR ENCODING AN IMAGE ALONG AN ORDER DETERMINED BY RESOLUTION TONE LEVEL

This application is a continuation of application Ser. No. 08/162,477 filed Dec. 7, 1993, now abandoned.

BACKGROUND OF THE INVENTION

The present invention relates to an image encoding device.

In a facsimile terminal or a printing terminal, for instance, an image to be transmitted or an image received is stored in a page memory. Also, in an image editing device, an image to be edited or an image edited is similarly stored in a page memory. The required capacity of the page memory is increased as the size of the image is increased and also as the resolution of the image is enhanced. Further, when a color image is to be stored, a capacity three times as large as in a monochromatic image is required. For example, when a full four-color image of A3 size having 16770 thousand colors/pixel is stored at a resolution of 400 dpi (dot/inch), a memory capacity of the page memory may be as great as 96M byte. Generally, the increase in memory capacity leads to a long processing time and a high cost.

As a solution of such problems, a technique decreasing the amount of data of image signals using data encoding has been proposed. For example, it has been proposed that an image signal is encoded highly efficiently in such a form that the image signal can be edited while it remains in an encoded state.

Such encoding requires the following three characteristic

First, the compressibility of every image unit must be uniform. Since the page memory has a predetermined limited capacity, data encoded at a preset compressibility as to every process unit of the original image signals must be accommodate in the page memory independent of the original image data. The image unit, in this case, necessarily has the capacity of at least one page. Especially in the case of the image editing device in which the data is edited as it is, the image unit necessarily is of a portion into which the data of one page is divided, for example, a block unit of 8 pixels×8 lines.

Second, it is necessary that every block unit can be encoded/decoded independently. This assures that the data can be edited as it is.

Third, the algorithm of image processing must be uniform among the types of images. This assures a high and constant speed of processing because encoded data can be written into and read out of the page memory.

Generally, prior image encoding devices for image accumulation and data transmission have restricted visual redundancy and statistical redundancy. Compressibility of such image encoding devices varies according to the fluctuation of any redundancy of the image data. Further, there has been a tendency to introduce a higher level of encoding processing, which makes it difficult to execute the encoding/decoding processing independently in every given image division unit. Further, due to the introduction of adaptive processing, a quantity of operation necessary for the encoding/decoding processing varies greatly according to the variations of redundancy in each of the image signals. For these and other reasons, with such a conventional image encoding device for image accumulation and data transmission, it is difficult to satisfy the above-mentioned characteristics.

As a technique to satisfy the above characteristics, image encoding devices such as disclosed in Japanese Laid Open publication Hei. 5-56282, assigned to the same assignee as the present invention, are constructed so as to accomplish constant compressibility of the input data by selecting a particular parameter set from possible parameters consisting of a sub-sampling shape, a sub-sampling ratio, and possible parameters as to tone level. The parameter set is predetermined to result in constant compressibility in every input block. However, the above image encoding devices are not constructed so as to restrict statistical redundancy. If an encoding means is added to restrict the statistical redundancy of the image encoding device, it is further necessary to add a control means of the amount of encoding data for constant compressibility to cope with a fluctuation of local redundancy.

Regarding the control of the amount of encoding data, there is proposed a thesis entitled "Bit-Rate Control Method for DCT (discrete cosine transform) Imaging Coding D-45" and a thesis entitled "A Rate-Adaptive DCT Coding for use in Solid-State Still Camera D-159" at an autumn meeting held by The Institute of Electronics Information and Communication Engineers.

The data encoding device of the JPEG type such as shown in D-45 comprises a blocking means for sampling an image and dividing the image into input blocks each consisting of a plurality of pixels, DCT transforming means for DCT transforming a pixel value in the block, storage means for temporarily storing coefficients of the conversion which have been converted, quantizing means quantizing the coefficients in a given resolution step, variable length coding means for variably encoding the output from the quantizing means, and measuring/inferring means for measuring the amounts of the output from the coding means and inferring a possible quantizing step according to the result of the measurement which will accomplish the given amount of encoding in every block. The means repeats measuring and inferring until the possible quantizing step for the given amount of encoding is found in such a manner that the amount of encoding is randomly counted under one of several, preset selected conditions.

However, since the data encoding device of this type necessarily has control errors in the amount of encoding, the data structure in this type of data encoding device has a margin of error for the given amount of encoding. The data encoding device of this type has an unfixed algorithm which could not determine when the amount of encoding reaches the given amount of encoding. Further it is necessary to provide for countermeasures in case of overflow of encoded data.

Reference is made to the data encoding device of the type disclosed in D-159 which comprises a blocking means for sampling an image and dividing the image into input blocks each consisting of a plurality of pixels, means for quantizing the DC composition of the block, means for determining the number of bits on encoding in each block on the basis of a step size according to the activity of each block, means for Huffman encoding the result of the quantizing so as to restrict the amount of encoding within the set amount determined by the number of bits on encoding, transformation means for DCT transforming a pixel value in the block, means for storing the coefficients of the DCT transformation which has been transformed, means for quantizing the coefficients of the DCT transformation on the basis of the step size aforementioned, means for Huffman encoding the result of the quantizing as to AC composition of the block so as to restrict the amount of encoding within the set amount determined by the number of bits on encoding, and a multiplexer for composing a DC encoding result and an AC encoding result. The encoding means for AC composition of the block are constructed so that while encoding the coefficients of the DCT transformation in a zig-zag scan in the storing means the execution of the encoding halts at the point when the amount of the AC encoding reaches a predetermined value.

The prior art such as shown in D-45 and D-159 has restriction means for controlling the amount of encoding. However, the encoded/decoded image attained by the prior art has room for improving. Since the prior art such as shown in D-45 and D-159 has to prepare a pretreatment, such as a preparation of a particular quantizing step size, etc., it is difficult to incorporate the encoded device shown in the prior art into an image encoding device for image accumulation and data transmission.

SUMMARY OF THE INVENTION

An object of the invention is to provide an image encoding device which overcomes the aforementioned problems.

Another object of the invention is to provide an image encoding device which provides high quality encoded image data.

Another object of the invention is to provide an image encoding device which provides high quality image data with a high ratio of encoding.

Yet another object of the invention is to provide an image encoding device which is suitable for image encoding for image accumulation and data transmission.

Yet another object of the invention is to provide an image encoding device which is suitable for use with a memory means such as a page memory.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

In accordance with one aspect of the invention, there is provided an image encoding device, having blocking means for sampling images and dividing each of the samples into input blocks each including m×n pixels where m and n are positive integers, analysis means for analyzing an amount of peculiarity consisting of the resolution and the tone levels of pixels in each block, truncation step and order determining means for determining approximate points having values of resolution and the tone level in each block according to the result of the analysis means, truncation step and order determining means for determining an approximate point having values as to the resolution and the tone levels in each block according to the result of the analysis means, truncation means for quantizing the image data with quantizing step determined by the truncation step and order determining means along the order determined by the truncation step and order determining means, and means for encoding the result of the quantizing means.

In accordance with another aspect of the invention, to achieve the above objects of the invention, there is provided an image encoding device, having blocking means for sampling images and dividing each of the samples into input blocks each including m×n pixels where m and n are positive integers, analysis means for analyzing an amount of peculiarity consisting of the resolution and the tone levels of pixels in each block, quantizing step determining means for determining approximate points having values of resolution and tone level in each block according to the result of the analysis means, processing order determining means for determining an order to be used in the value of any approximate point, means for quantizing the image data inputted in the quantizing step determined by the quantizing step determining means in the order determined by the processing order determining means, and means for encoding the result of the quantizing means.

In accordance with another aspect of the invention, there is provided an encoding device, blocking means for sampling images and dividing each of the samples into input blocks each including m×n pixels where m and n are positive integers, analysis means for analyzing an amount of peculiarity consisting of the resolution and the tone levels of pixels in each block; quantizing step determining means for determining a target point including an optimum resolution and an optimum tone level in each block and one or more approximate point(s) having value(s) of resolution and the tone level in each block according to the result of the analysis means, the approximate values being no more than values of the target point in resolution and tone level, processing order determining means for determining an order to be used in the value of any approximate point to the target point, means for quantizing the image data inputted in the quantizing step determined by the quantizing step determining means in the order determined by the processing order determining means, and means for encoding the result of the quantizing means.

In accordance with the invention there is further provided means for counting the result of the encoding means, the counting means having a preset length as to allowable encoded data and trigger means for stopping the processing of the encoding means.

An advantage of the present invention is high compressibility of image encoding due to restricting both visual and statistical redundancy.

In progressing from one approximate point to another approximate point, image quality in encoding always increases in every approximate point. Consequently, at the time when the trigger means is operated, high quality image encoding is achieved for a preset amount of encoding. The amount of encoded data in every block is kept to a minimum for image quality.

Since every block is encoded independently and uniformly at constant compressibility, the encoding devices in accordance with the invention are suitable for image accumulation and data transmission.

Another advantage of the present invention is the elimination of the need for countermeasures for overflowing amounts of encoded data.

Other features of the present invention will become apparent as the following description proceeds and upon reference to the drawings.

BRIEF DESCRIPTION OF THE DRAWINGS

The accompanying drawings, which are incorporated in and constitute a part of this specification illustrate embodiment(s) of the invention and, together with the description, serve to explain the objects, advantages and principles of the invention.

In the accompanying drawings.

DETAILED DESCRIPTION OF THE PREFERRED EMBODIMENTS

The present invention will be described in detail by way of the embodiments thereof with reference to the accompanying drawings.

Figure 1:
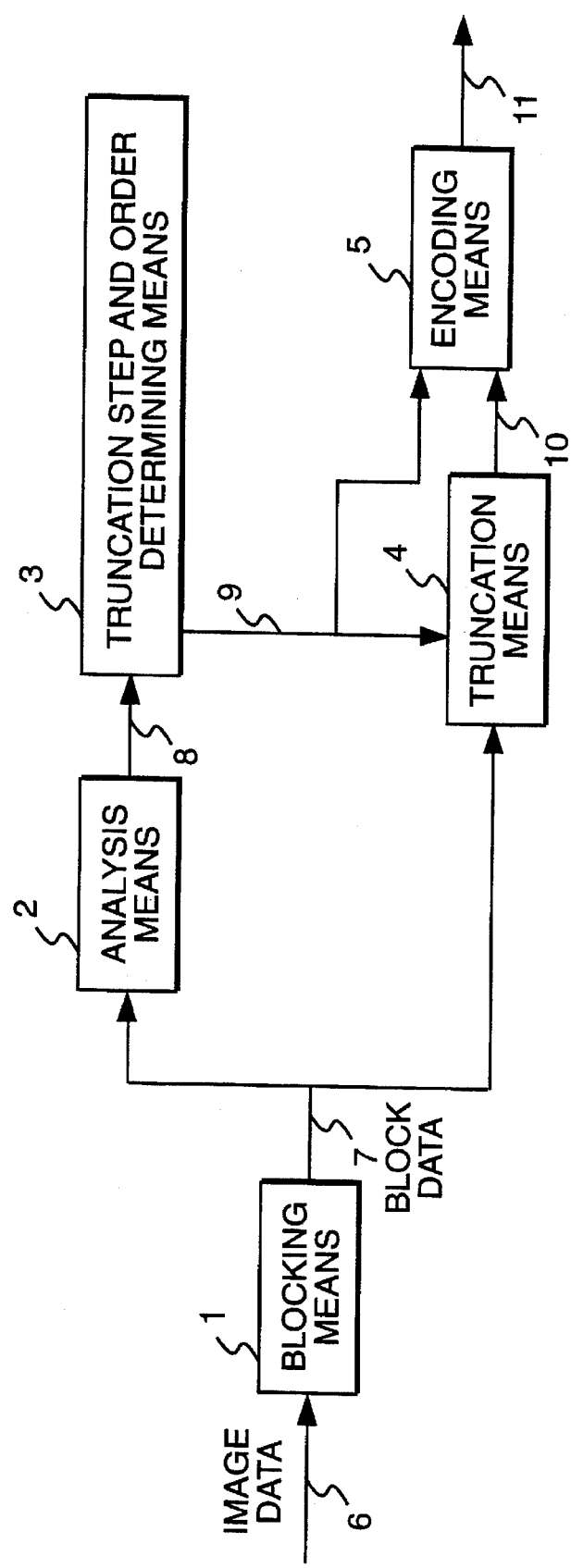
FIG. 1 shows a block diagram of the structure of an embodiment of an image encoding device according to the invention.

FIG. 1 shows a block diagram of the general structure of an image encoding device according to the invention.

Referring to FIG. 1, blocking means 1 samples images data 6 and divides each of the samples into input blocks each including m×n digital pixels where m and n are positive integers, respectively, and outputs block data 7. An analysis means 2 analyzes an amount of peculiarity consisting of the resolution and the tone level of pixels in each block, and outputs result 8 of the analysis.

Quantizing step and order determining means 3, which corresponds to a truncation step and order determining means, includes means for determining a target point and approximate points expressed as resolution and tone levels in each block.

The truncation step and order determining means 3 also determines an order 9 using values of any approximate point toward the target point.

Truncation means 4 quantizes the image data inputted in the quantizing step determined by the quantizing step determining means 3 along the order determined by the processing order determining means 3. Encoding means 5 encodes the result of the quantizing means 4 and order 9, and outputs encoded data 11 which is not more than an allowable preset length. Encoding means 5 includes means for counting the amount of the result of itself and trigger means for stopping the processing of the encoding means.

In the image encoding device shown in FIG. 1, the image data 6 is sampled and divided into input blocks 7 each including m×n pixels by the blocking means 1, where m and n are positive integers, respectively. The block data 7 is analyzed by analysis means 2, and an amount of peculiarity as to the resolution and the tone levels of pixels in data block 7 is determined from pixels in each block. The analysis means 2 outputs a result 8.

In quantizing step and order determining means 3, an order assigned to a plurality of points, consisting of resolution and tone levels to be processed, is determined in accordance with the result 8. Processing then progresses with the values of resolution and tone levels along the assigned order. In this connection, quantizing step and order determining means 3 processes and seeks values sufficiently large to decode under preset values of encoding error according to the result 8. The assigned order at least sets the values into line to create a hierarchy with respect to the resolution and tone levels, respectively. However, the hierarchy may contain a value which is insufficient to decode under preset values of encoding error on decoding. Then, quantizing step and order determining means 3 determines an approximate point consisting of one value from the hierarchy of resolution and one value from the hierarchy of tone levels so that approximate points can be linked along the order.

In particular, a target point can be defined as one of several approximate points and, however, the nearest point to the original image. Therefore if encoding with values having the target point, the ceiling on image quality of coding can be achieved. The order is defined as a series of approximate points toward the target point.

The quantizing means 4 outputs quantized and subsampled values, that is, truncated values, of resolution and tone values along the assigned order. Output 10 from the quantizing means 4 is encoded by encoding means 5. Output 11 from encoding means 5 contains information in the assigned order 9 for decoding. The encoding means 5 also counts a summation of amounts of encoded data according to the number of points which have been executed. The encoding means 5 also has a trigger means for stopping the processing of the encoding means at the time when the summation reaches a preset allowable length to ensure a restriction of controlling amounts of the encoded data under the preset allowable length.

Hereinafter, description of the embodiment is explained in detail with reference to FIGS. 2–7.

Figure 2:
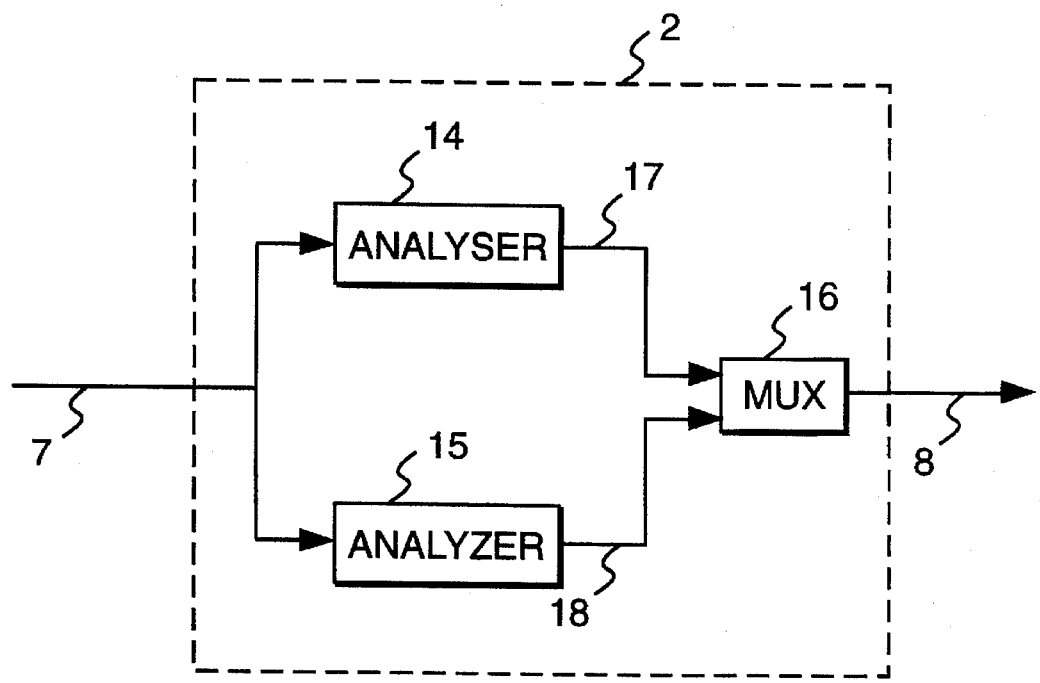
FIG. 2 shows an analysis means of the embodiment shown in FIG. 1.

The analysis means 2 shown in FIG. 2 is provided with an analyzer 14, an analyzer 15, and a multiplexer 16. Analyzer 14 analyzes the amount of peculiarity, or feature, of the tone levels of pixels in each block 7. Analyzer 15 analyzes the amounts of peculiarity, or feature, of the resolution of the pixels in each block 7. Multiplexer 16 combines analyzed results of tone level analyzer 14 with analyzed results of resolution analyzer 15, and outputs analyzed result 8.

Figure 3:
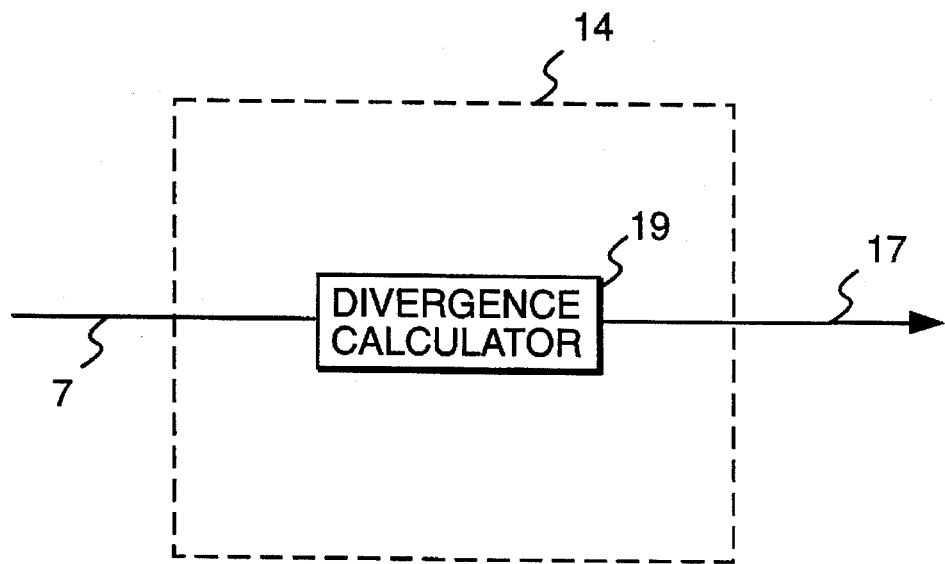
FIG. 3 shows an analysis means for tone levels in any block of the analysis means shown in FIG. 2.

Tone level analyzer 14 shown in FIG. 3 is provided with a distribution calculator 19 for calculating the degree of distribution in the block and outputting the result 17.

Figure 4:
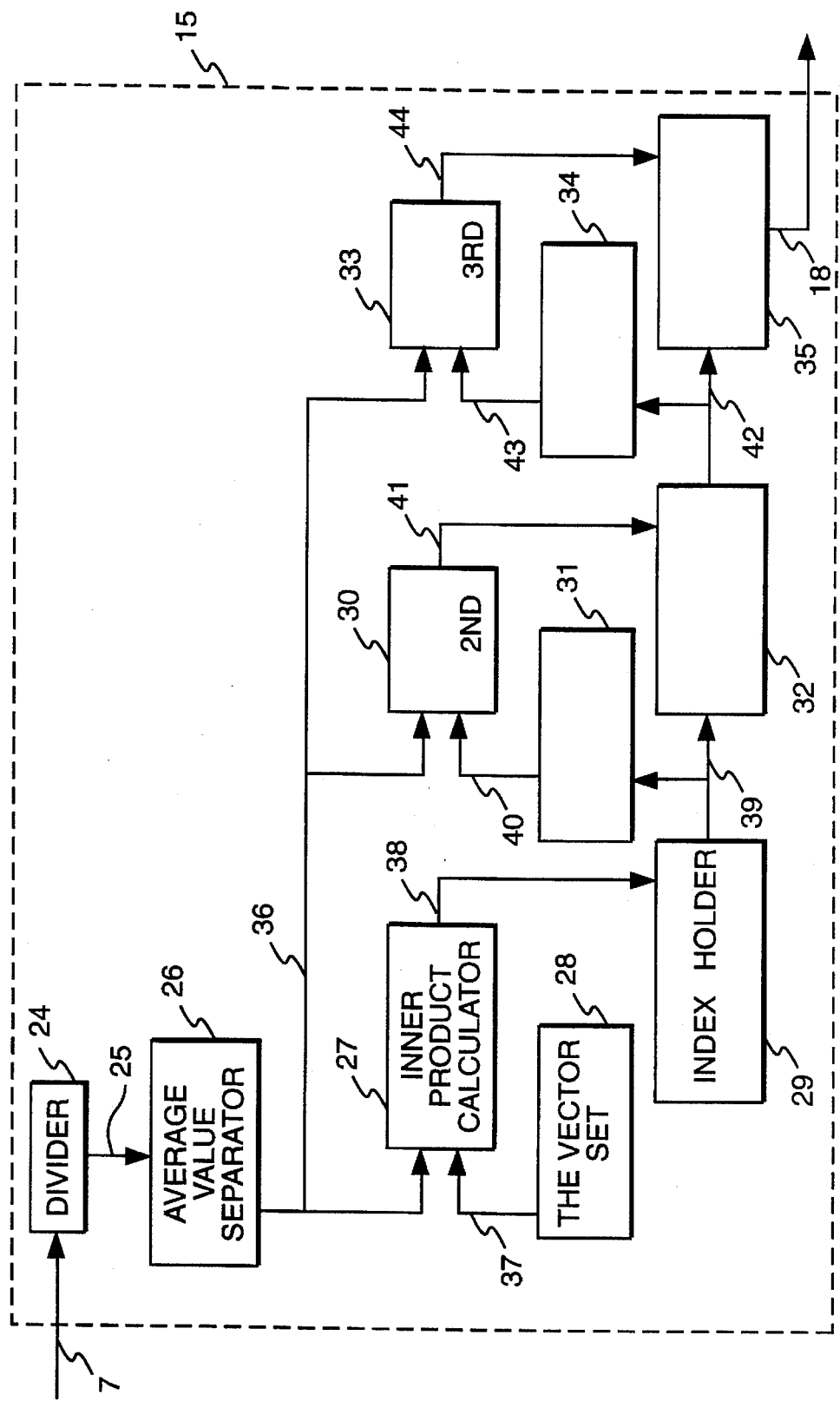
FIG. 4 shows an analysis means for resolution in any block of the analysis means shown in FIG. 2.

Resolution analyzer 15 is shown in FIG. 4. In resolution analyzer 15, a block divider 24 divides block 7 into each block unit 25 with any ratio of positive integers. An average value separator 26 obtains an average value of the block unit 25, and outputs a value subtracting the average value from each pixel value. A first vector set 28 is preset with representative shape blocks 37. First inner product calculator 27 obtains an inner product between average value separation block 36 and any representative shape blocks 37 in the first vector set 28, and outputs a polar of positive or negative of the inner product. First index holder 29 holds the polar code 38 of the first inner product calculator 27 as an index. Second vector set 31 is preset with sets of representative shape blocks. Second inner product calculator 30 obtains an inner product between average value separation block 36 and any representative shape blocks 40 being shown as index 39 in second vector set 31, and outputs a polar 41 of positive or negative of the inner product. Second index holder 32 holds polar code 41 and index 39 as a new index. Third vector set 34 is preset with sets of representative shape blocks. Third inner product calculator 33 obtains an inner product between average value separation block 36 and any representative shape blocks 43 being shown as index 42 in second vector set 34, and outputs a polar 44 of positive or negative of the inner product. Third index holder 35 holds polar code 44 and index 42 as a new index and outputs results of analysis of the resolution. In the embodiment, the first vector set includes only one vector data.

Figure 5:
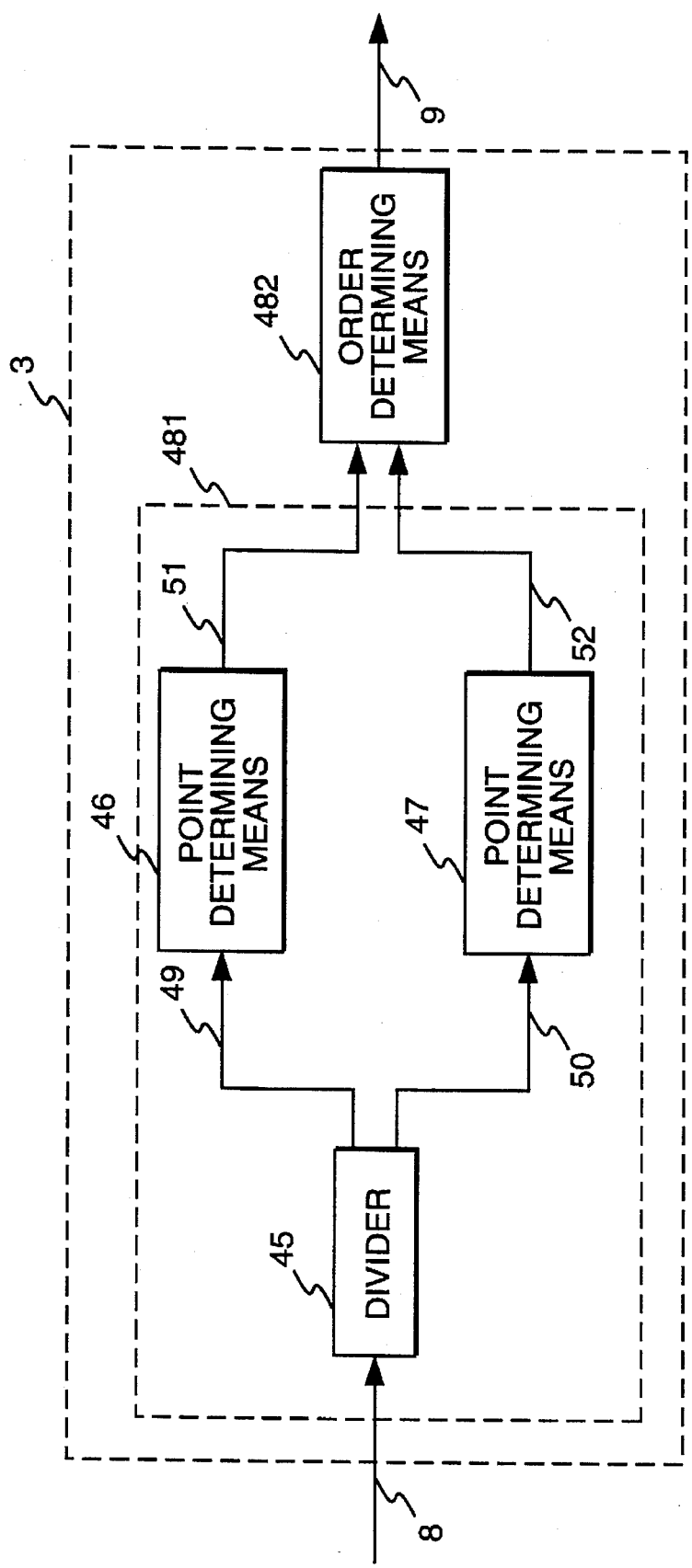
FIG. 5 shows a processing order determining means and quantizing step determining means of the embodiment shown in FIG. 1.

Referring to FIG. 5, the quantizing step and order determining means 3 is provided with means 481 for determining a target point and approximate points of the resolution and the tone level in each block and means 482 for determining an order to be used in the value of any approximate point to the target point.

Target point determining means 481 is provided with a divider 45, a point determining means 46, and a point determining means 47. Divider 45 respectively divides analysis result 8 into a tone level analysis result 49 and resolution analysis result 50. A tone level approximate, or truncation, point determining means 46 obtains tone levels in a hierarchy large enough to decode under a preset encoding error, and outputs the tone levels in a hierarchy as result 51. A resolution approximate, or truncation, point determining means 47 obtains resolution data in a hierarchy large enough to decode under preset encoding error, and outputs the resolution in a hierarchy as result 52.

Determining means 482 defines the order 9 to be used in the value of any approximate point to the target point from the results 51 and 52 of the resolution and the tone level in hierarchy.

Figure 6:
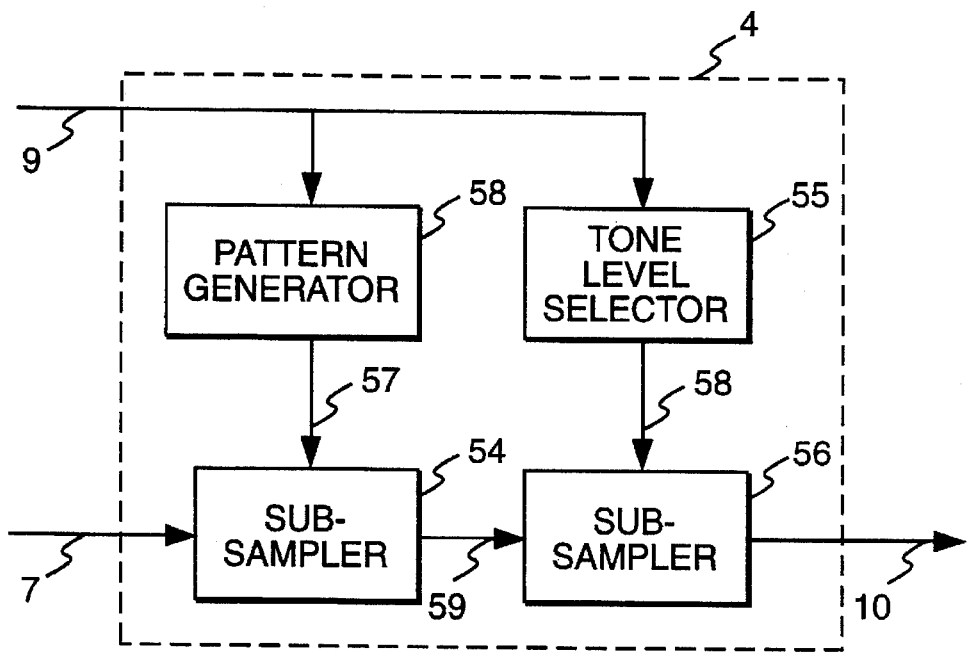
FIG. 6 shows quantizing means by the quantizing step determined by the quantizing step determining means of the embodiment shown in FIG. 1.

Quantizing means 4 is shown in FIG. 6. A pattern generator 53 determines a sub-sampling pattern 57 of resolution according to the value determined by the order 9. A sub-sampler 54 sub-samples pixels of the input block 7 according to the sub-sampling pattern 57. A tone level selector 55 outputs a signal 58 for selecting some bit-planes according to the tone levels of approximate points determined by order 9 from bit-planes the number of which has been predetermined. A tone level sub-sampler 56 outputs sub-sampling results consisting of bit-planes selected according to the signal 58.

Figure 7:
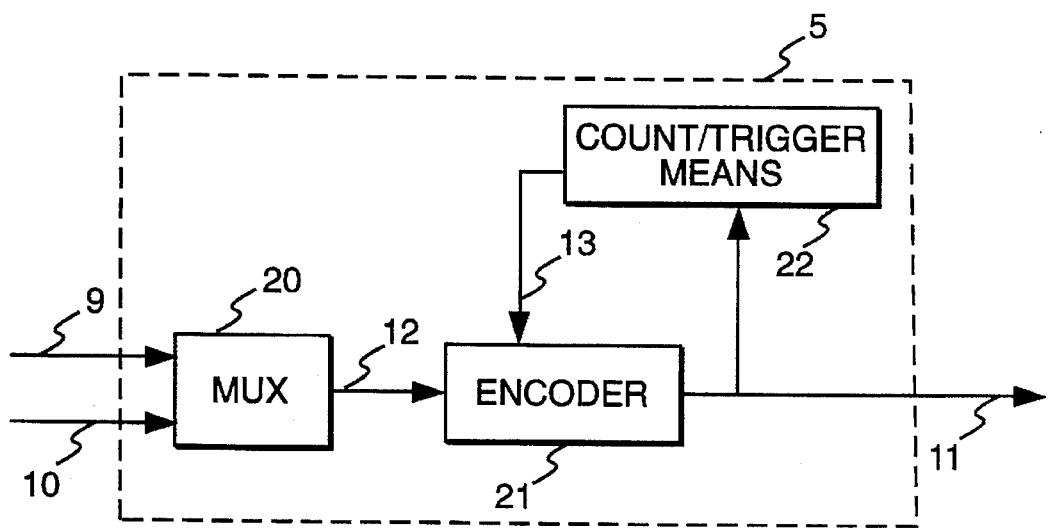
FIG. 7 shows encoding means of the embodiment shown in FIG. 1.

Encoding means 5 is shown in FIG. 7. A multiplexer 20 adds the information of the order 9 for decoding in a later stage with output 10 from the quantizing means 4. The multiplexer 20 further counts amounts of quantizing at each approximate point which has been executed along the order.

Output 12 from multiplexer 20 is encoded by encoder 21 using, for example, entropy coding or Huffman encoding which are commonly used in the art.

The encoding means 5 has count/trigger means 22 for summing amounts of encoded data on the basis of the number of approximate points which have been executed, and for triggering a stop of the processing of the encoding means 21 at the time when the summation reaches a preset allowable length. The count/trigger means then outputs an overflow signal 13 to the encoder 21 to ensure a restriction of controlling amounts of the encoded data under the preset allowable length.

The operation of the trigger ensures that the summation of the encoded data reaches a predetermined amount of length in each input block to which the amount of the encoded data exceeds a fixed maximum length allowable to each block or is just less than the fixed maximum length.

In operation of the above encoding device, image data 6 is sampled and divided into input blocks 7 each including m×n pixels where m and n are positive integers, respectively. The output of the blocking means 1 is supplied to tone level analyzer 14 of analysis means 2 shown in FIG. 2. The output of the blocking means 1 is also supplied to the truncation means 4.

Tone level characteristics of block 7 are analyzed in tone level analyzer 14, and resolution characteristics are analyzed in resolution analyzer 15. The analyzing result 17 of tone level analyzer 14 and the analyzing result 18 of resolution analyzer 15 are multiplexed by multiplexer 16 and outputted as a tone level/resolution analyzing result 8.

In tone level analyzer 14 shown in FIG. 3, distribution values of input block 7 are calculated by distribution calculator 19, and outputted as resolution analyzing result 17.

The resolution analyzer 15 is an image signal analysis device such as proposed in Japanese Laid Open publication 40823/1993.

Before analyzing the resolution feature of the block, as shown in FIG. 4, an advance vector set is set in the resolution analyzer 15 as shown below. A plurality of representative shape blocks are preset in branches of a binary tree which is composed of a plurality of steps. The representative shape block is representative of typical blocks in which density gradient direction is horizontal, vertical, or oblique, etc.

Next, while treating representative shape blocks preset in each branch as vector data, a vector difference of two representative shape blocks having been set in branches to be a pair is calculated, and results of this calculation are set in a node as a representative vector difference into which branches of a tree to be a pair spreads.

Lastly, sets of representative vector differences set in a node in each step are stored in each vector set 28, 31 and 34. Input block 7 is divided by block divider 24 with a ratio of integers where each integer is positive. An average value of pixels in each divided block 25 is obtained by average value separator 26, and average value separation blocks 36 are output which subtract the average value from each pixel value in divided block 25.

In operation regarding feature amount analysis, an inner product is calculated by first inner product calculator 27 between average value separation block 36 and representative shape blocks 37 stored in the first vector set 28, and polar 38 of positive or negative of the inner product is output. The result of the inner product, polar 38, is held as an index in first index holder 29. Next, an inner product is calculated by second inner product calculator 30 between average value separation block 36 and representative shape blocks 40 specified by index 39 of representative shape blocks stored in the second vector set 31, and polar 41 of positive or negative of the inner product is output.

The result of the inner product, polar 41, and index 39 are held as a new index in second index holder 32. Lastly, an inner product is calculated by third inner product calculator 33 between average value separation block 36 and representative shape blocks 43 specified by index 42 of representative shape blocks stored in the third vector set 34, and polar 44 of positive or negative of the inner product is output. The result of the inner product, polar 44, and index 42 are held as a new index in third index holder 35.

As mentioned above, each divided block 25 is treated in the same way. Sets of indices to each divided block 25 are held by third index holder 35, and sets of indices held are output as resolution analysis result 18. At this time, the index held in third index holder 35 is representative of a shape of waves in case of grasping input block 7 as two dimensional waves of images.

The resolution analysis result 18 obtained by resolution analyzer 15 is multiplexed by multiplexer 16 with the result 17 of tone level analyzer 14, and is output as analysis result 8 from analysis means 2 shown in FIG. 2.

The analysis result 8 is supplied to an image quality inferring means 481 of order determining means 3 as shown in FIG. 5, and is divided by divider 45 into the result of tone level 49 and the result of resolution 50.

According to the result of tone level 49, a tone level approximate point determining means 46 determines hierarchy 51 by allocating the number of tone levels according to the figure of distribution values of pixel values in the block 7. For example, the more the distribution value increases, the greater the number of tone levels. According to the result of tone level 50, a resolution approximate point determining means 47 determines hierarchy 52 by allocating a great enough number of resolutions corresponding to sampling frequency to be able to reproduce the inherent shape of waves in each block 7 according to the result of resolution 50, that is, the shape of waves in the block 7.

For example, hierarchy 52 for resolution is determined in such a manner that, in the case of long period of a cycle in which wave shape changes in block 7, that is, not containing high component of spacial frequency, low resolutions, i.e., long period of sample cycles, are allocated to reproduce the inherent wave shape in the block. Also, hierarchy 52 is determined in such a manner that, in the case of containing many edges in step in block 7, that is, containing high component of special frequency, high resolutions, i.e., short period of sampling cycles, are allocated to reproduce the inherent wave shape in the block.

Consulting the hierarchies 51 and 52, by the order determining means 482 is determined order 9 which increases in turn the number of tone level and resolution toward the target point beginning from a lower point of tone level and resolution.

Figure 8:
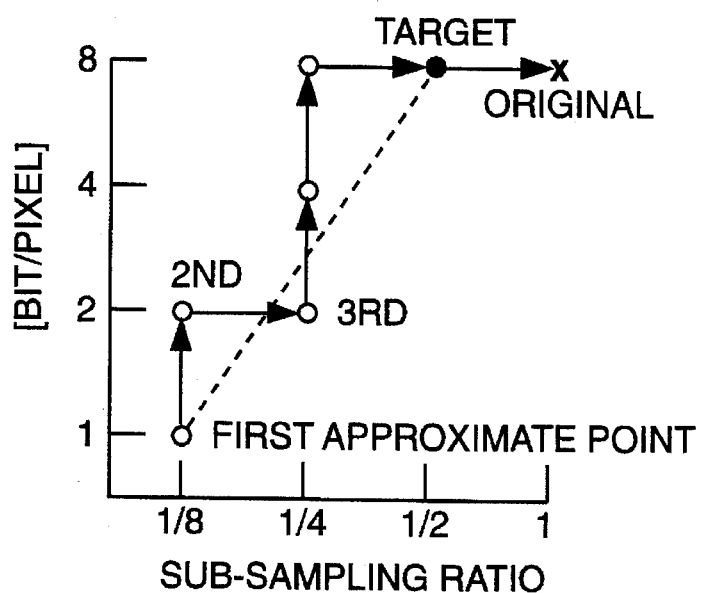
FIGS. 8 and 9 are explanatory diagrams to explain the operation of the processing order determining means of the embodiment of an image encoding device according to the invention.

For better understanding of the determining of the order of the present invention, with reference to one embodiment of the invention described in FIG. 8, an ordinate axis means a ratio of the sub-sampling and corresponds to resolution of image. A transverse axis means the number of bits per pixel and also means $Log_2 x$ where x is the tone level of images. In FIG. 8 five approximate points and a target point nearest to the original point are disclosed. Order 9 begins from the first approximate point toward the fifth approximate point nearest to the target point, and defines a sequence to be calculated.

After reaching, target point values for tone level and resolution are selected from the pass between the target point and the point shown as original image. In FIG. 8, the first approximate point is the point with the most least amount of image information. This embodiment is of order 9 larger than 1 in an angle of inclination from first approximate point to target point.

Figure 9:
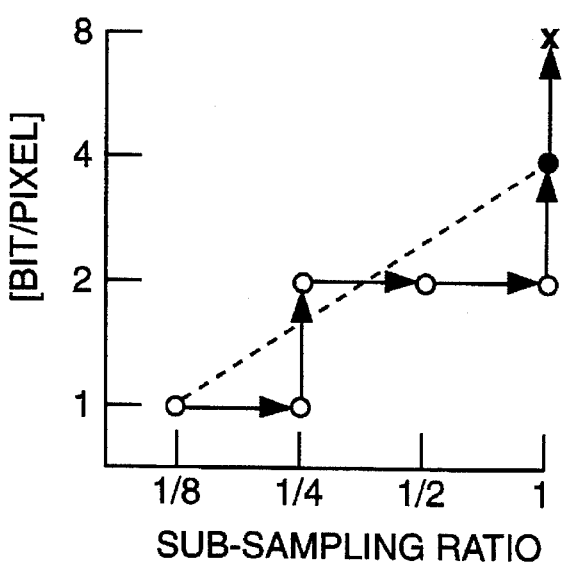

With reference to another embodiment of the invention described in FIG. 9, the same order is disclosed apart from an angle of inclination from the first approximate point to the target point being smaller than 1.

Figure 11:
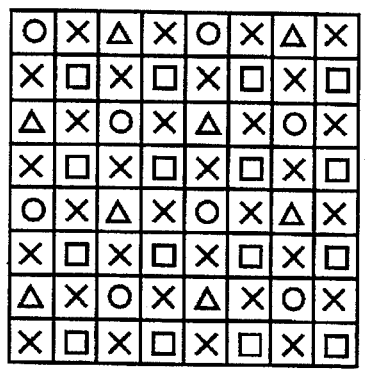
FIG. 11 is an explanatory diagram showing some values of resolution in the quantizing means shown in FIG. 6.
Figure 12:
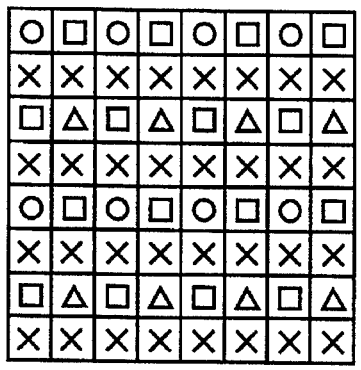
FIGS. 12 and 13 are explanatory diagrams to explain the operation of the quantizing means.
Figure 13:
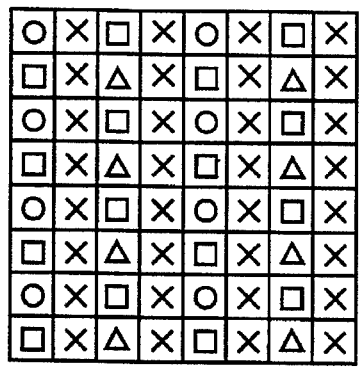

The order 9 is supplied to pattern generator 53 and tone level selector 55 of quantizing means 4 as shown in FIG. 6, and the sub-sampling pattern 57 is in turn prepared by pattern generator 53. For example, pattern generator 53 generates sub-sampling pattern 57 as shown in FIGS. 11, 12, and 13 show a correspondence of the ratio of sub-sampling and sub-sampling pattern 57 in case of input block 7 composed of 8 lines×8 pixels. FIG. 11 is an isotropic diagram in two-dimensional direction. However, it may be of non-isotropy in two-dimensional direction which changes the ratio of sub-sampling in longitudinal direction or transverse direction as shown FIGS. 11 or 13.

It is preferable to adaptively change the sub-sampling pattern according to the resolution analysis result 18 that is wave shapes of the input block. For example, since input block 7, having longitudinal edges, includes a high component of spacial frequency in the transverse direction and does not include a high component of spacial frequency in the longitudinal direction, it is preferable to increase resolution in the transverse direction and decrease resolution in the longitudinal direction for representing original images as shown in FIG. 12. On the contrary in the case of input block 7 having transverse edges, it is preferable to use the sub-sampling pattern as shown in FIG. 13.

Input block 7 is sub-sampled by sub-sampler 54 according to the sub-sampling pattern 57 one after another, and is output as pixels 59 being sub-sampled.

Figure 14:
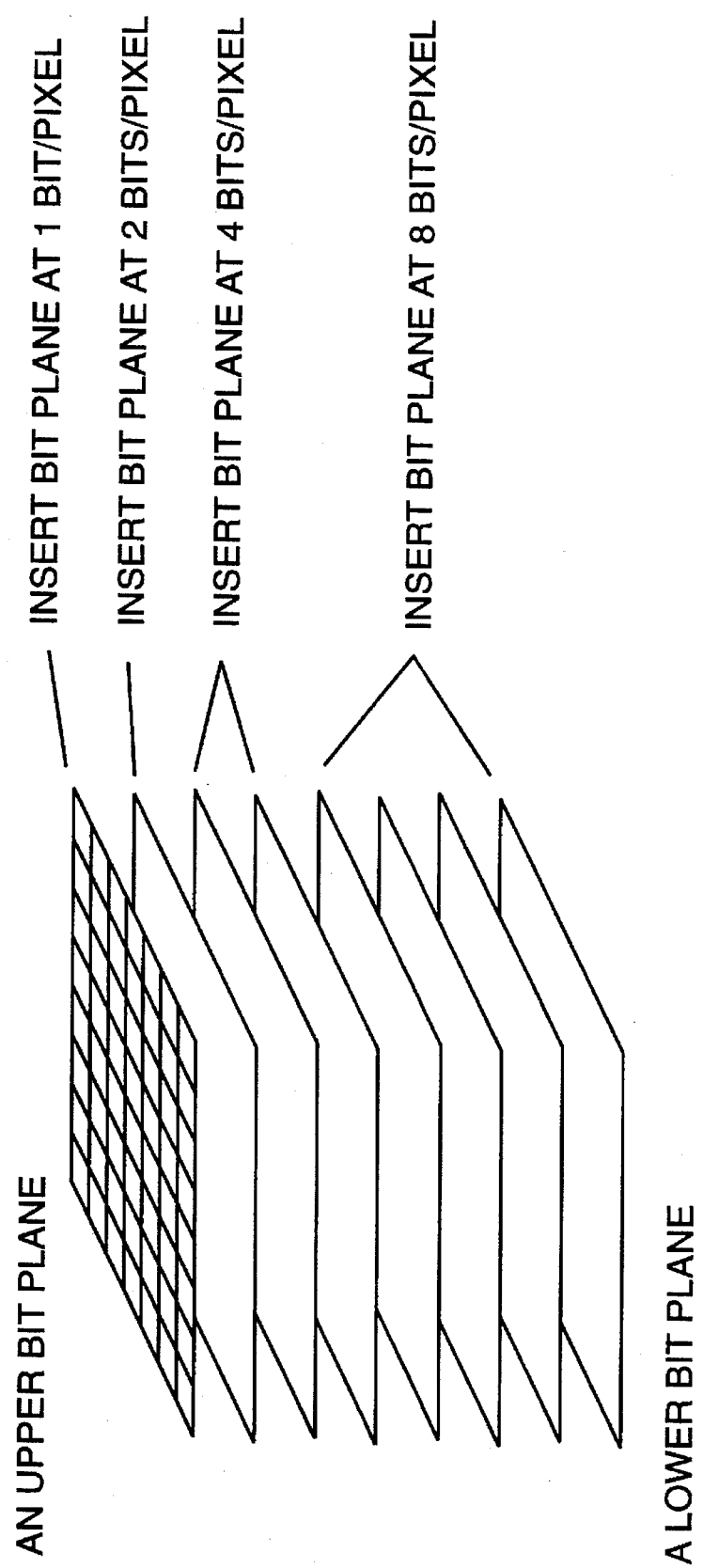
FIG. 14 is an explanatory diagram to explain the control of the tone levels by the quantizing means.

The order 9 is supplied to tone level selector 55 and is converted into bit-plane selecting signal 58 by tone level selector 55. In the case of FIG. 14, bit-plane selecting signal 58 is generated according to the number of bits per pixel corresponding to the tone level of the order 9. FIG. 14 shows the correspondence of the number of bits per pixel and some bit-planes to be selected.

Pixel 59 being sub-sampled by sub-sampler 54 is sub-sampled by sub-sampler 53 according to the bit-plane selecting signal 58 one after another, and is output.

As mentioned above, tone level information, that is, bit-plane information and resolution information, that is, pixel pattern information, is point by point output by quantizing means 4 along the order 9 beginning from the first approximate point through all approximate points and the target point toward the point of original images. The order 9 from order determining means 3 and the output result from quantizing means 4 are supplied to multiplexer 20 of encoding means 5 and are multiplexed by multiplexer 20 along the order 9 beginning from the first approximate point through any approximate points and the target point toward the point of original images.

The summation of amounts of encoded data 11 is counted by the count/trigger means 22 and overflow signal 13 generated at the time when the summation reaches a preset allowable length or when the summation leaves a preset margin fixed immediately before the preset allowable length. The arithmetic encoder 21 halts encoding of result 12 on receiving the signal 13.

Figure 10:
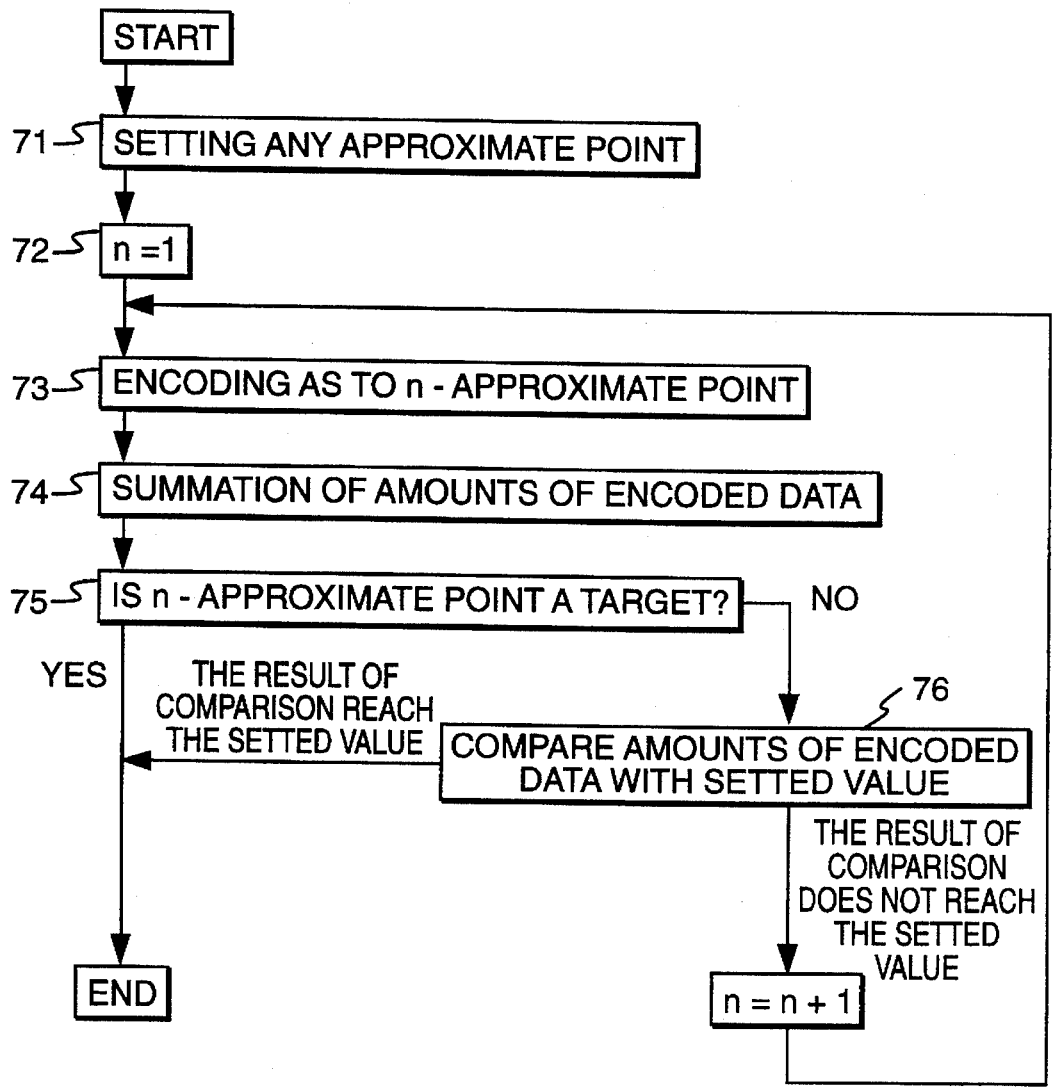
FIG. 10 is a flow chart of the processing of the count/ trigger means of the encoding means shown in FIG. 7.

With reference to FIG. 10, a flow chart describing the processing of the count/trigger means 22 is shown. The processing of the count/trigger means 22 includes the following steps: At step 71 a target point is set and encoding processing begins from first approximate point at step 72. At step 73 an input block of the image data is processed with parameters determined by the first approximate point and the summation of amounts of encoded data is obtaining at step 74 and it is determined whether the approximate point now processing is a target point or not at step 75. If yes, the processing of the count/trigger means 22 halts. If no, at step 76 the summation is compared with a preset allowable length or a fixed preset margin. When the summation does not reach the preset allowable length or fixed preset margin, the input block of the image data is processed with parameters determined by the second approximate point for improving the image quality within a preset encoding length. The processing of the count/trigger means 22 is repeated until summation reaches the preset allowable length of the fixed preset margin.

When the summation reaches the preset allowable length or the fixed preset margin, encoding processing to a particular input block is concluded in the encoding device. Encoding processing is transferred to the next input block of images. As mentioned above, encoding processing is processed to all data of images.

Figure 15:
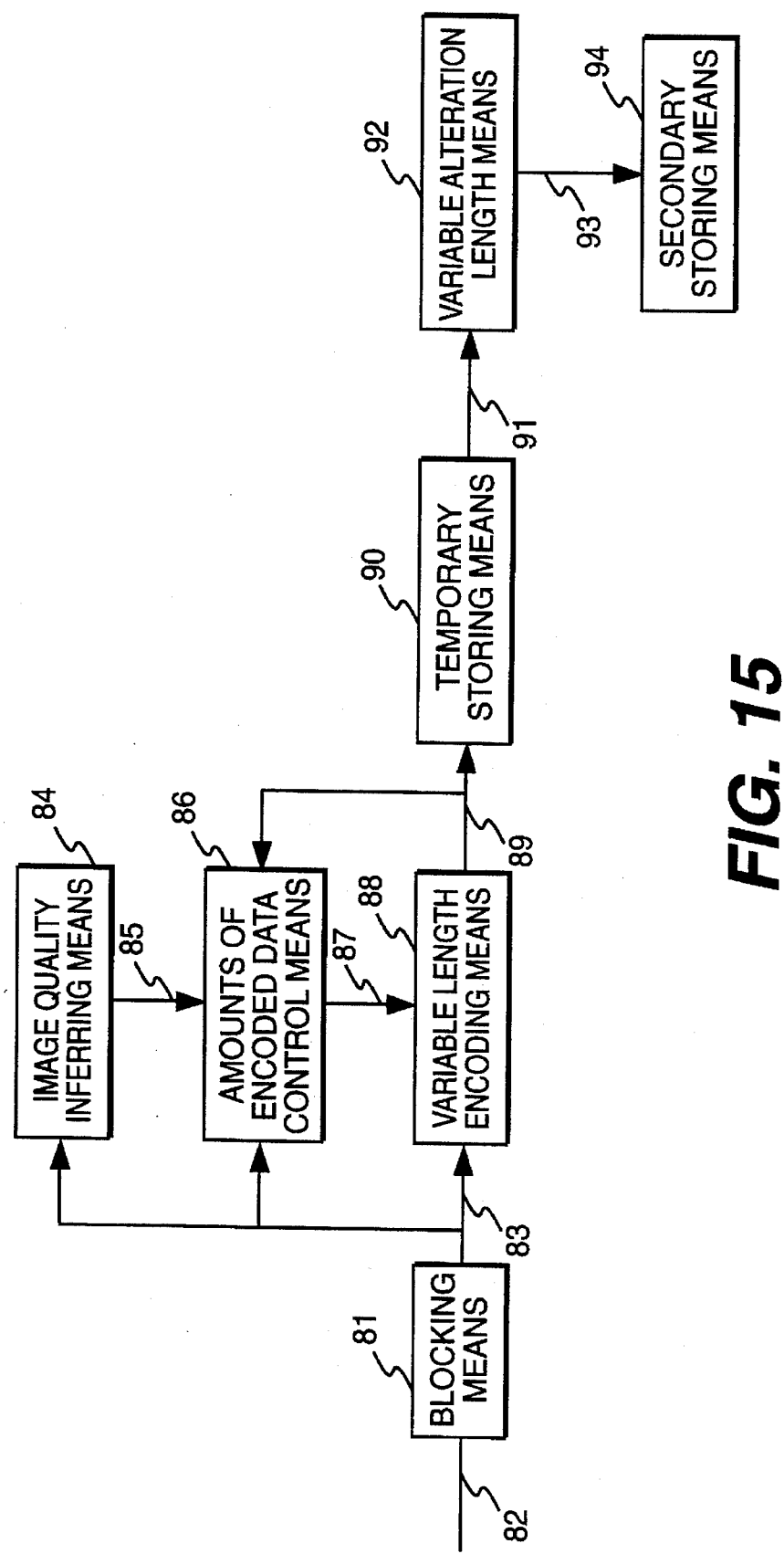
FIGS. 15 and 16 shows block diagrams of the structure of other embodiments of an image encoding device according to the invention.

With reference to FIG. 15, another embodiment of the encoding device of the invention is shown. A blocking means 81 samples images data 82 and divides each of the samples into input blocks each including m×n pixels where m and n are positive integers, respectively, and outputs block data 83. Image quality inferring means 84 infers an image quality of input data after decoding the encoded data, and outputs the result 85 inferred. Encoded data control means 86 outputs encoded parameter 87 so as to encode one or a plurality of input blocks within a preset amount of encoding data to within a preset amount of encoding data and with decode error not more than a preset decoded quality on the basis of order 9 shown in FIG. 5. A variable length encoding means 88 encodes input block 83 according to encoded parameter 87 in such a manner that input block 83 is encoded within a fixed length which corresponds to amounts of a maximum encoding restriction while inserting a discriminating code into the encoded data length at the time when amounts of encoding data reach the preset length at a point of immediately after the last bit of the preset length in cooperation with the amounts of encoded data control means 86. Means 90 temporarily stores encoded data 89 of fixed length. A variable alteration length means 92 changes the encoded length by subtracting surplus encoded data from data 91 which is excessively allocated in reproduction of images. A secondary storing means 94 stores output data 93.

Figure 16:
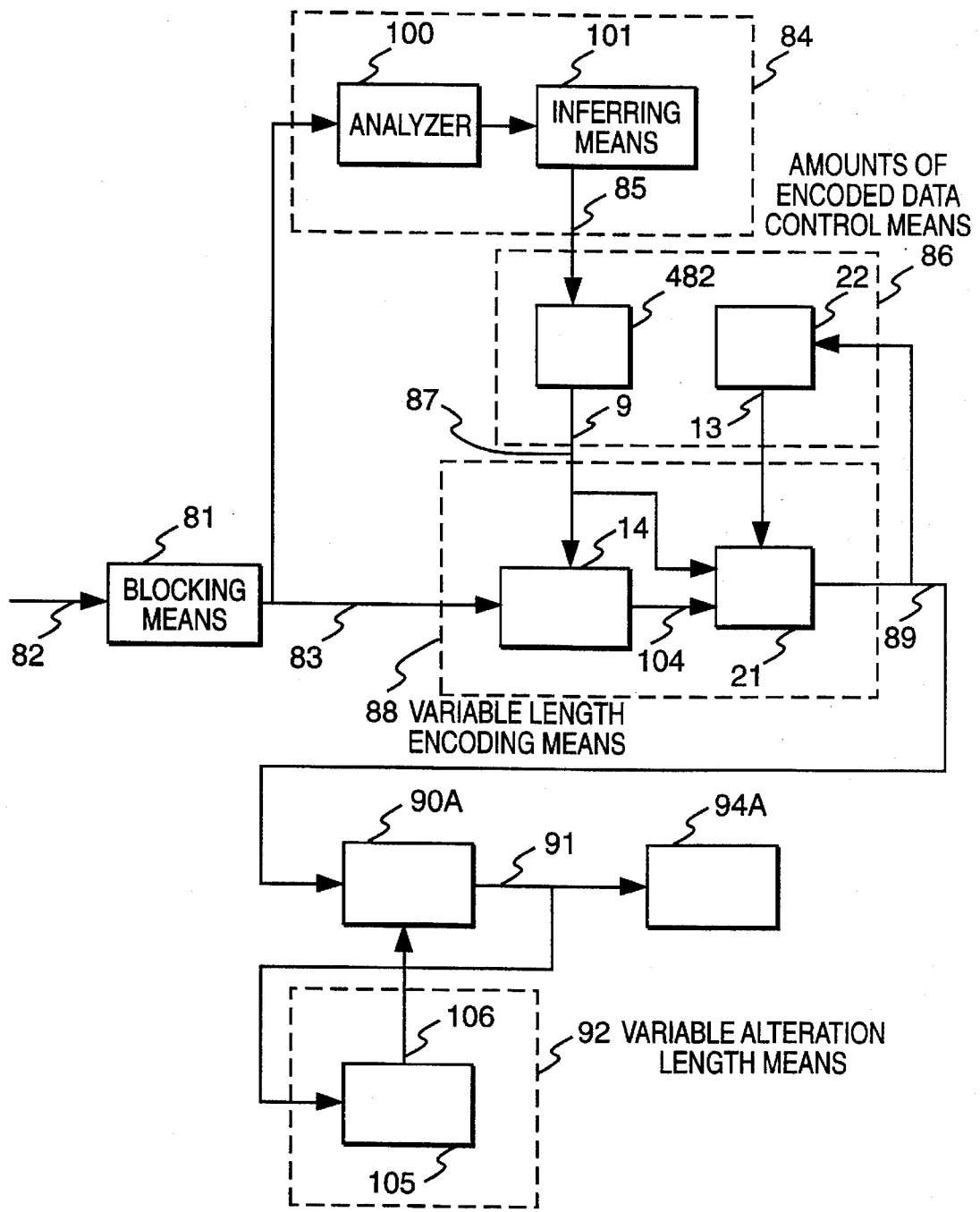

With reference to FIG. 16, the embodiment of the invention is further described in detail. The image quality inferring means. 84 is provided with tone level/resolution analyzer 100 and inferring means 101. Tone level/resolution analyzer 100 is composed of tone levels analyzer 14 and resolution analyzer 15 which are respectively shown in FIGS. 3 and 4. The inferring means 101 is composed of tone level approximate point determining means 46 and resolution approximate point determining means 47 respectively shown in FIG. 5 and outputs the inferred result 85. The amounts of encoded data control means 86 is provided with order determining means 482 shown in FIG. 5 and count/trigger means 22 shown in FIG. 7 in cooperation with variable length encoding means 88. The order determining means 482 outputs order 9 as defined by FIGS. 8 and 9. The variable length encoding means 88 is provided with quantizing means 4 shown in FIG. 6 according to quantizing step determined by order 9 and arithmetic encoder 21 shown in FIG. 7. The variable length encoding means 88 outputs the results 104 into arithmetic encoder 21. The encoded data 89 outputted from arithmetic encoder 21 is counted by count/trigger means 22 and overflow signal 13 is generated at the time when the summation in count/trigger means 22 reaches a preset allowable length or when the summation leaves a preset margin fixed immediately before the preset allowable length.

The arithmetic encoder 21 halts encoding of result 12 on receiving the signal 13. Also on receiving the signal 13, variable length encoding means 88 inserts the discriminating code into the encoded date length at the point immediately after the last bit of the fixed length. After inserting the discriminating code, quantizing result of the input block is encoded by arithmetic encoder 21 until the amount of encoded data reaches a predetermined length, for example, the same values as processing speeds used in a main processor, an image scanner terminal, or an image output terminal. Therefore variable length encoding means 88 conducts a fixed length encoding in cooperation with amounts of encoded data control means 86.

The result 89 from arithmetic encoder 21 is stored in temporary storing means 90, for example, page memory 90A. The temporary storing means 90 is connected with variable alteration length means 92 comprising a detector 105 of discriminating code being added by variable length encoding means 88.

In operation, when coding data stored in temporary storing means 90 is stored into secondary storing means 94, for example, a hard disk storing means 94A, detector 105 addresses an only data which is defined by addresses from the beginning to discriminating code by an address signal 106, and then the addressed data is supplied to secondary storing means 94 and is stored in such a manner that encoded data does not always have a fixed length.

Figure 17:
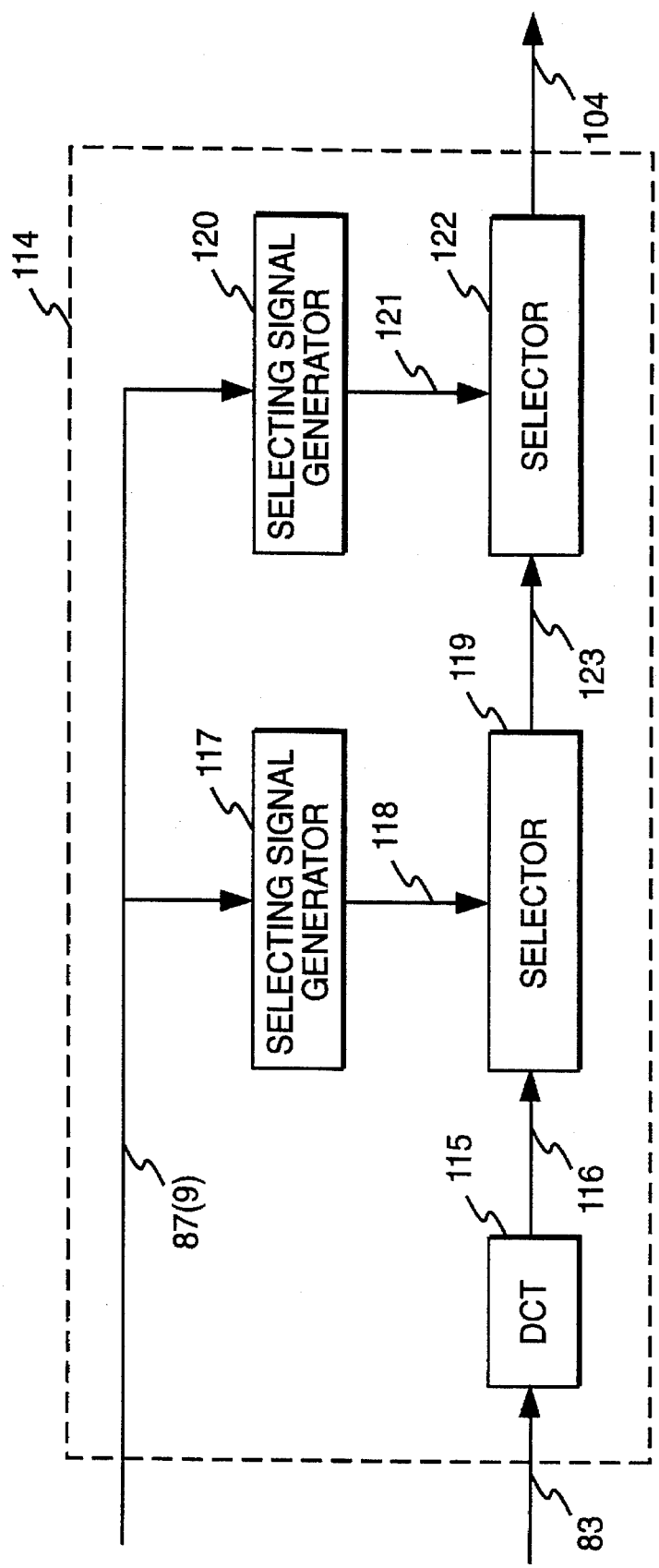
FIG. 17 shows another embodiment of quantizing means of the encoding device of the invention.

With reference to FIG. 17, another embodiment of quantizing means of the encoding device of the invention is shown. This quantizing means is of JPEG type such as a hierarchy dividing method using spectral sections (s-s) or successive approximations (s-a) of progressive encoding (see International Standard of Multi Media Encoding written by Yasuda, published from Maruzen, pages 24–28).

A quantizing means 114, shown in FIG. 17 includes a discrete cosine transform means 115, a selecting signal generator 117, a selector 119, a tone level selecting signal generator 120, and a tone level selector 122. Discrete cosine transform (DCT) means 115 transforms the input block and outputs a coefficient of transformation 116 of DCT. Selecting signal generator 117 outputs selecting signals 118 for selecting the coefficient of transformation according to the order 9. Selector 119 selects the coefficient of transformation 116 on the basis of selecting signals 118. Tone level selecting signal generator 120 outputs selecting signals 121 for selecting a bit-plane of the coefficient of transformation 116 according to the order 9. Tone level selector 122 selects a bit-plane of the coefficient of transformation 123 selected by selector 119 on the basis of selecting signals 121, and outputs quantizing data 104 as to resolution and tone level.

The information of the order 9 is in turn transformed into selecting signals 118 by selecting signal generator 117 and selector 119 selects coefficient of transformation 116 to quantize the input block by resolution. In this connection, for example, coefficient of transformation 116 is selected from the lower dimension side to the higher dimension side like s-s type of hierarchy dividing method.

Also, the information of the order 9 is in turn transformed into selecting signals 121 by selecting signal generator 120, and selector 122 selects a coefficient of transformation 123 to quantize the input block by tone level. In this connection, for example, coefficient of transformation is selected from MSB side to LSB side like s-a type of hierarchy dividing method.

In this embodiment of selecting the coefficient of DCT transformation, it is accomplished to encode image data with less defect within a limited amount of length and it can encode or decode to conform to JPEG method being well progress in standardization in ISO and CCITT.

While the invention has been described with reference to particular preferred embodiments, the invention is not limited to the specific examples given. Other embodiments and modifications can be made by those skilled in the art without departing from the spirit and scope of the invention. For example, in the above embodiment arithmetic encoding is used for encoding information, the invention is not limited to the encoding means of the type of that and may be used an encoding means of the type of Huffman encoding.

What is claimed is:

1. An image encoding device comprising:

blocking means for dividing images into input blocks, each input block including a predetermined number of pixels sampled to a predetermined resolution and a predetermined tone level;

analysis means for analyzing an amount of peculiarity of the resolution and tone level of the pixels in each block and for generating an analysis result;

quantizing step determining means for determining approximate points having resolution values and tone levels high enough to decode at less than a present encoding error according to the analysis result;

processing order determining means for determining a processing order as a series of three or more of said approximate points, said three approximate points each having a different tone level which increases the resolution value or tone level beginning from a lower approximate point of resolution and/or tone level;

resolution quantizing means for selecting pixels in the input block of the predetermined resolution according to the resolution value of the approximate points selected by the quantizing step determining means along the processing order;

tone level quantizing means for quantizing the tone level value of the pixels of the predetermined tone level in the input block according to values of the tone level of the approximate points selected by the quantizing step determining means along the processing step order;

encoding means for encoding the results from the resolution quantizing means and the tone level quantizing means; and amount of encoded data controlling means for permitting the encoding means to encode until the summation of the encoded data reaches a preset allowable amount of data.

2. The image encoding device as defined in claim 1, wherein said tone level quantizing means quantizes the value of tone level relating to the pixels selected by the resolution quantizing means.

3. The image encoding device as defined in claim 1, wherein said encoding means includes an arithmetic encoder.

4. The image encoding device as defined in claim 1, wherein said resolution quantizing means includes a resolution sub-sampler for resolution.

5. The image encoding device as defined in claim 1, wherein said tone level quantizing means includes a sub-sampler for tone level.

6. The image encoding device as defined in claim 5, wherein said tone level sub-sampler has a plurality of bit-planes to be selected according to the tone level values of the approximate points.

7. The image encoding device as defined in claim 1, further comprising:

means for storing the result from the encoding means.

8. An image encoding device comprising:

blocking means for sampling images and dividing each of the samples into input blocks, each input block including m×n pixels where m and n are positive integers;

analysis means for analyzing an amount of peculiarity of the resolution and tone level of the pixels in each block and for generating an analysis result;

quantizing step determining means for determining approximate points having resolution values and tone levels high enough to decode at less than a present encoding error according to the analysis result;

processing order determining means for determining a processing order as a series of three or more of said approximate points, said three approximate points each having a different tone level which increases the resolution value or tone level beginning from a lower approximate point of resolution and/or tone level;

resolution quantizing means for selecting pixels in the input block according to the resolution value of the approximate point selected by the quantizing step determining means along the processing order;

tone level quantizing means for quantizing the tone level value of the pixels in the input block according to the tone level value of the approximate point selected by the quantizing step determining means along the processing step order;

encoding means for encoding the results from the resolution quantizing means and the tone level quantizing means; and amount of encoded data controlling means for permitting the encoding means to encode until the summation of the encoded data reaches a preset allowable amount of data.

9. The image encoding device as defined in claim 8, wherein said image level quantizing means quantizes the tone level value relating to the pixels selected by the resolution quantizing means.

10. The image encoding device as defined in claim 8, wherein said encoding means includes an arithmetic encoder.

11. The image encoding device as defined in claim 8, wherein said resolution quantizing means includes a resolution sub-sampler for resolution.

12. The image encoding device as defined in claim 8, wherein said tone level quantizing means includes a sub-sampler for tone level.

13. The image encoding device as defined in claim 12, wherein said tone level sub-sampler has a plurality of bit-planes selected according to the tone level value of the approximate point.

14. The image encoding device as defined in claim 8, further comprising:

means for storing the encoding means results.

* * * * *